Sept. 15, 1959  P. E. REYMOND  2,903,845
WINDING UP MECHANISM FOR TIME-PIECES
Filed Jan. 7, 1955  2 Sheets-Sheet 1

INVENTOR
Paul E. Reymond
BY Philip S. Hillel
ATTORNEY

Sept. 15, 1959 P. E. REYMOND 2,903,845
WINDING UP MECHANISM FOR TIME-PIECES
Filed Jan. 7, 1955 2 Sheets-Sheet 2
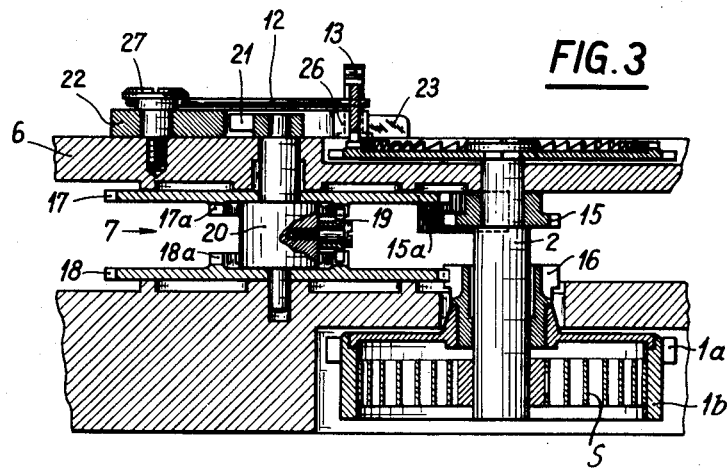
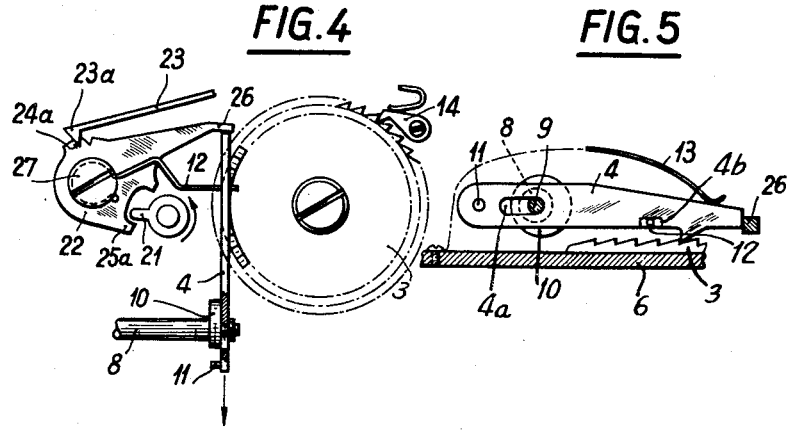
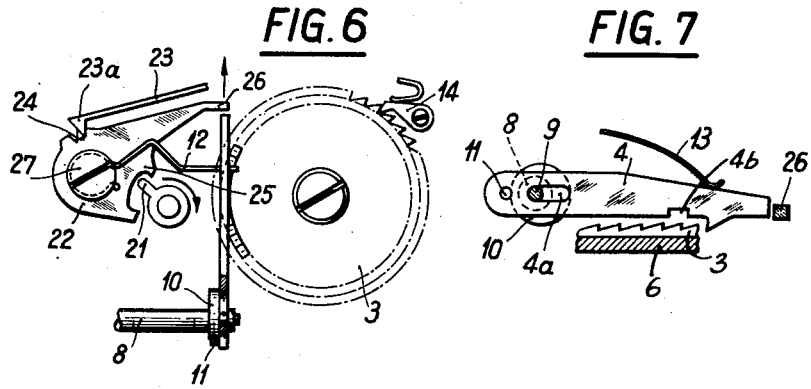
INVENTOR
Paul E. Reymond
BY Philip S. Hilbert
ATTORNEY

2,903,845

WINDING UP MECHANISM FOR TIME-PIECES

Paul E. Reymond, L'Orient, Switzerland

Application January 7, 1955, Serial No. 480,559

Claims priority, application Switzerland
September 8, 1954

6 Claims. (Cl. 58—46)

My invention has for its object a mechanical winding-up system for time-pieces including an arrangement releasing the winding-up mechanism before the main spring is overwound and re-engaging the same when the main spring has partly unwound without, however, this preventing the complete unwinding in the case of a failure of the winding-up system; my novel arrangement is actuated by a sun-and-planet gear, the planet wheel of which meshes with two sun wheels associated respectively with the barrel arbor and with the barrel drum. According to my invention, a rocker lever is submitted to the action of a jumper which is secured to the case and is adapted to occupy two operative positions, and the said rocker lever, controlled by the planet pinion of the sun-and-planet gear, acts directly on the member winding up the main spring, so as to engage the said member with the automatic winding-up system, or to disengage same; this arrangement is such that when the main spring is completely wound up, the winding-up system is disconnected and when the main spring has expanded through a predetermined arc, it shifts the rocker lever and sets its jumper until, at the end of the travel of the main spring through said arc, the jumper snaps suddenly into another operative position so that the rocker lever re-engages the above mentioned winding-up system; the same procedure is performed in the opposite direction when the main spring has been wound up completely and has travelled back throughout the above mentioned arc.

Figure 1:
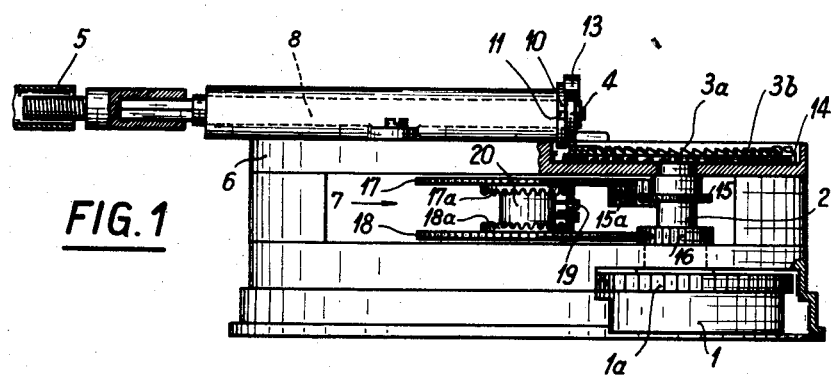
Figure 2:
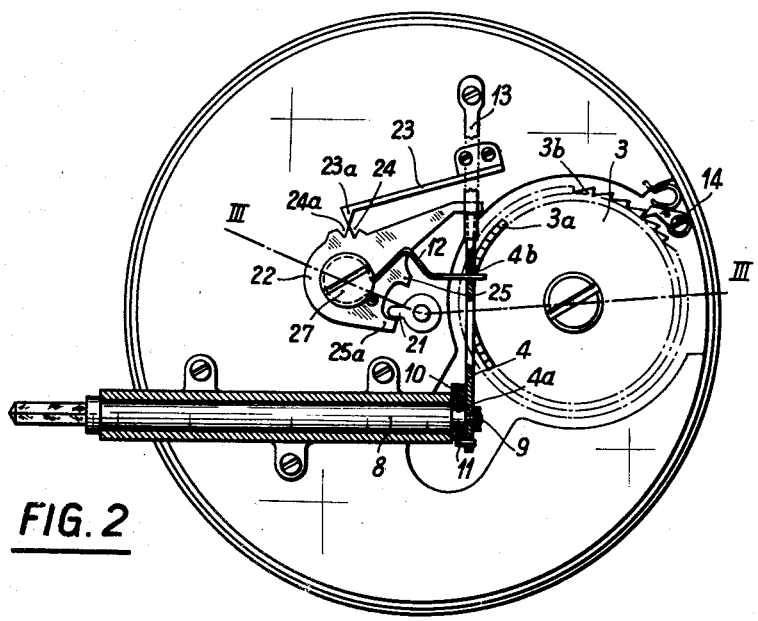

I have illustrated by way of example in accompanying drawings a preferred embodiment of my invention; in said drawings:

Fig. 1 is an elevational view of the said embodiment;
Fig. 2 is a plan view thereof;
Fig. 3 is a cross-section through line III—III of Fig. 2;
Figs. 4 and 6 illustrate detail views explaining the operation of the parts shown in Fig. 2;
Figs. 5 and 7 are elevational views of a detail of Fig. 2.

The time-piece illustrated which is assumed to be mounted on a vehicle, includes a mainspring barrel the teeth 1a at the perpihery of which control the clockwork. To the arbor 2 of said barrel connected in a conventional manner with the barrel drum 1b by the main spring S illustrated diagrammatically in Fig. 3, is secured the winding-up ratchet wheel 3 the peripheral teeth 3a of which cooperate with a driving catch 4 controlled in its turn through a Bowden cable 5 by the revolution meter or odometer of the vehicle.

A sun-and-planet gear 7 is secured to the underside of the plate 6. This plate forms part of the mechanism framework which is not illustrated any more than the mechanism or clockwork or the actual case for the time-piece since these form no part of the actual invention. The Bowden cable 5 drives a spindle 8 revolubly carried by the mechanism framework and rigid with an eccentric 10 cooperating with a roller 11 on the driving catch 4 so as to impart a reciprocatory movement to the latter. The end 9 of the spindle 8 engages a longitudinal cut 4a in the driving catch 4 so as to allow the said spindle to move with reference to the latter, to provide for the operation of the eccentric and for spacing the roller 11 with reference to the latter.

A return spring 12 enters a notch 4b in the driving catch 4 and cooperates with the latter so as to urge the roller 11 thereon into engagement with the eccentric 10 (Fig. 2). A further return spring 13 one end of which is secured to the frame cooperates with the catch and urges the latter into engagement with the winding-up ratchet wheel.

A pawl 14 is adapted to engage the peripheral teeth 3b on the ratchet wheel. The barrel arbor 2 carries a pinion 15 controlling through the transmission gear 15a revolubly fitted on the plate 6 the sunwheel 17 of the sun-and-planet gear 7. The other sunwheel 18 of the sun-and-planet gear is controlled directly by a pinion 16 rigid with the barrel drum. The planet pinion 19, cooperating with the teeth 17a and 18a extending perpendicularly to the planes of the sunwheels and coaxially rigid with the latter, drives the spindle 20 provided with a nose 21 extending over the upper surface of the plate 6.

The said plate 6 carries a rocker lever 22 adapted to assume two different positions corresponding to two operative positions of the jumper 23 secured to the case. In the first inoperative position of the rocker lever, the end 23a of the jumper 23 enters a notch 24a in the rocker lever 22 (Fig. 4), whereas, for the second operative position, the end 23a of the said jumper engages another notch 24 on the rocker lever, as illustrated in Fig. 6. The rocker lever 22 carries two stops 25 and 25a between which the nose 21 may move and with which the said nose 21 cooperates with a view to urging the said rocker lever out of one operative position into another. When the rocker lever enters the position illustrated in Fig. 4, its end 26 pushes the driving catch 4 longitudinally so as to shift the roller 11 away from the eccentric and to disconnect the automatic winding-up system with reference to the said catch. The latter is re-engaged as soon as the rocker lever returns into the position illustrated in Fig. 6 so as to release its arm 26 with reference to the catch. The return spring 12 is secured to the rocker lever 22 by a screw 27 and moves together with the said rocker lever so as not to oppose the movements of the latter through its action on the catch.

Fig. 6 shows the mechanism while the catch is engaged and the winding-up system winds up the mainspring through the agency of the winding-up ratchet wheel and of the barrel arbor 2. The pinion 15 drives through the transmission gear 15a, the sunwheel 17, the planet pinion 19, the spindle 20, so that the nose 21 on the latter, which is now in contacting relationship with the stop 25a, shifts gradually the rocker lever until the latter enters the intermediate position illustrated in Fig. 2 and the jumper makes the said rocker lever snap suddenly into the position illustrated in Fig. 4 so as to disconnect the catch.

The winding-up procedure being at an end, the mainspring unwinds and drives the spindle 20 in the opposite direction through the agency of the barrel 1, of the pinion 15, of the sunwheel 18 and of the planet pinion 19. When the nose 21 has executed its return travel through a predetermined arc, it engages the stop 25 and carries along with it the rocker lever 22 so as to make the mechanism assume the position illustrated in Fig. 6 for which the winding-up means may again operate through reengagement of the catch. If the winding-up means are no longer operative, the unwinding continues since the sun-and-planet gear allows independence between the winding-up means and the barrel drum.

Obviously, my invention is by no means limited to the embodiments illustrated and in particular, the time-piece may be wound up otherwise than through the revolution meter of the vehicle. It may, in fact, be constituted by a time-piece which is not intended for use on board a vehicle and it may be wound up automatically through an oscillating mass, as in the case of self-winding watches.

What I claim is:

1. In combination with a time-piece including a mechanism plate, a main spring, a barrel arbor and a barrel drum coaxial therewith and between which the main spring is fitted, said barrel arbor and barrel drum being revolubly mounted with reference to said plate, the combination of winding means, a reciprocating catch carried by the plate and controlled by said winding means, a ratchet wheel controlled by said catch and coaxially rigid with the barrel arbor, a sun and planet gear including two sunwheels controlled respectively by the arbor and by the barrel drum, a planet pinion meshing with said sunwheels and a carrier coaxial with the sunwheels, carrying the planet pinion and extending into the vicinity of the ratchet wheel, a rocker lever pivotally secured to the plate, provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, means whereby the planet carrier controls the angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, and means whereby the shifting of said rocker lever into each of its predetermined positions prevents or allows operation of the catch of the winding means, respectively.

2. In combination with a time-piece including a mechanism plate, a main spring, a barrel arbor and a barrel drum coaxial therewith and between which the main spring is fitted, said barrel arbor and barrel drum being revolubly mounted with reference to said plate, the combination of winding means, a reciprocating catch carried by the plate and controlled by said winding means, a ratchet wheel controlled by said catch and coaxially rigid with the barrel arbor, a sun and planet gear including two sunwheels controlled respectively by the arbor and by the barrel drum, a planet pinion meshing with said sunwheels and a carrier coaxial with the sunwheels, carrying the planet pinion and extending into the vicinity of the ratchet wheel, a rocker lever pivotally secured to the plate, provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, a radial projection on the planet carrier, two angularly spaced stops on the rocker lever located to either side of the axial projection on the planet carrier and adapted to be engaged selectively by said projection upon rotation of the planet carrier in the direction of the stop considered to provide an angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, and means whereby the shifting of said rocker lever into each of its predetermined positions prevents or allows operation of the catch of the winding means, respectively.

3. In combination with a time-piece including a mechanism plate, a main spring, a barrel arbor and a barrel drum coaxial therewith and between which the main spring is fitted, said barrel arbor and barrel drum being revolubly mounted with reference to said plate, the combination of a winding up member, an eccentric controlled by said member, a longitudinally slidable catch controlled by said eccentric to make a reciprocatory movement, a ratchet wheel rigid with the barrel arbor and actuatable by the reciprocating catch to make the arbor rotate, a sun and planet gear including two sunwheels controlled respectively by the arbor and by the barrel drum, a planet pinion meshing with said sunwheels and a carrier coaxial with the sunwheels, carrying the planet pinion and extending into the vicinity of the ratchet wheel, a rocker lever pivotally secured to the plate, provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, means whereby the planet carrier controls the angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, and means whereby the shifting of said rocker lever into each of its predetermined positions holds the catch fast against reciprocation or releases it, respectively.

4. In combination with a time-piece including a mechanism plate, a main spring, a barrel arbor and a barrel drum coaxial therewith and between which the main spring is fitted, said barrel arbor and barrel drum being revolubly mounted with reference to said plate, the combination of a winding up member, an eccentric controlled by said member, a catch slidingly mounted with reference to the eccentric, a roller carried by the catch and operatively controlled by the eccentric to make the catch perform a reciprocatory movement, a rocker lever pivotally secured to the plate, a spring secured to the pivotal point of the rocker lever and engaging the catch to urge the latter in the direction engaging the roller with the eccentric, a ratchet wheel coaxially rigid with the barrel arbor and actuatable by the reciprocating catch to make the arbor rotate, a sun and planet gear including two sunwheels controlled respectively by the arbor and by the barrel drum, a planet pinion meshing with said sunwheels and a carrier coaxial with the sunwheels, carrying the planet pinion and extending into the vicinity of the ratchet wheel, the rocker lever being provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, means whereby the planet carrier controls the angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, and means whereby the shifting of said rocker lever into each of its predetermined positions moves the catch with reference to the eccentric to urge the roller on said catch respectively into or out of its position of engagement by the eccentric.

5. In combination with a time-piece including a mechanism plate, a main spring, a barrel arbor and a barrel drum coaxial therewith and between which the main spring is fitted, said barrel arbor and barrel drum being revolubly mounted with reference to said plate, the combination of a winding up member, an eccentric controlled by said member, a catch slidingly mounted with reference to the eccentric, a roller carried by the catch and operatively controlled by the eccentric to make the catch perform a reciprocatory movement, a rocker lever pivotally secured to the plate, a spring secured to the pivotal point of the rocker lever and engaging the catch to urge the latter in the direction engaging the roller with the eccentric, a ratchet wheel coaxially rigid with the barrel arbor and actuatable by the reciprocating catch to make the arbor rotate, a sun and planet gear including two sunwheels controlled respectively by the arbor and by the barrell drum, a planet pinion meshing with said sunwheels and a carrier coaxial with the sunwheels, carrying the planet pinion and extending into the vicinity of the ratchet wheel, the rocker lever being provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, means whereby the planet carrier controls the angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, and an arm on the rocker lever registering with the catch and shifting the latter with reference to the eccentric and to urge the roller out of a position for which it engages the eccentric, against the action of the spring, when said rocker lever is in one of its predetermined positions.

6. In combination with a time-piece including a mechanism plate, a main spring, a barrel arbor and a barrel drum coaxial therewith and between which the main spring is fitted, said barrel arbor and barrel drum being revolubly mounted with reference to said plate, winding up means including a ratchet wheel with peripheral teeth coaxially rigid with the barrel arbor, a slidable catch reciprocable with reference to the teeth to control intermittent progression, a winding member controlling the reciprocation of the slidable catch to rotate the ratchet wheel and barrel arbor, a sun and planet gear including two sunwheels controlled respectively by the arbor and by the barrel drum, a planet pinion meshing with said sunwheels and a carrier coaxial with the sunwheels, carrying the planet pinion and extending into the vicinity of the ratchet wheel, a rocker lever pivotally secured to the plate, provided with two adjacent notches and shiftable angularly in a plane perpendicular to the axis of the barrel arbor, a jumper one end of which is secured to a stationary point of the plate and the other end of which engages selectively the two notches in the rocker lever to hold the latter selectively in two predetermined angular positions, means whereby the planet carrier controls the angular shifting of the rocker lever in a direction corresponding to its own direction of movement to make the said rocker lever snap into the corresponding position defined by the jumper when the said planet carrier has executed a travel between predetermined limits corresponding to a winding of the main spring and to an unwinding thereof to a predetermined extent and reversely, the rocker lever forming in one position a stop engaging one end of the reciprocating catch to prevent movement of the latter and in the other position releasing the catch.

References Cited in the file of this patent
UNITED STATES PATENTS 2,709,332     Meyer _____ May 31, 1955

FOREIGN PATENTS 288,796     Switzerland _____ June 1, 1953